United States Patent
Ling et al.

[11] Patent Number: 6,147,307
[45] Date of Patent: Nov. 14, 2000

[54] SIDE INSERTION TRAP

[75] Inventors: Geoffrey Ling, North Barrington; Steven Akiyama, New Lenox; Alice Jandrisits, Des Plaines; Louis Lai, Brookfield, all of Ill.

[73] Assignee: Cooper Technologies Company, Houston, Tex.

[21] Appl. No.: 09/177,111

[22] Filed: Oct. 22, 1998

[51] Int. Cl.[7] .................................................. H02G 3/18
[52] U.S. Cl. ........................ 174/65 G; 174/135; 248/56; 16/2.1; 16/2.2
[58] Field of Search ................ 174/65 G, 153 G, 174/152 G, 65 R, 31 R, 135, 50, 58; 248/56, 62, 63; 16/2.1, 2.2; 220/3.2, 3.8, 4.02

[56] References Cited

U.S. PATENT DOCUMENTS

| | | | |
|---|---|---|---|
| 3,123,662 | 3/1964 | Fink | 16/2.5 |
| 3,424,856 | 1/1969 | Coldren | 174/153 |
| 3,493,205 | 2/1970 | Bromberg | 248/56 |
| 3,562,847 | 2/1971 | Jemison | 16/2 |
| 3,564,113 | 2/1971 | Kindler | 174/65 |
| 3,991,446 | 11/1976 | Mooney et al. | 24/73 |
| 4,000,875 | 1/1977 | Jemison et al. | 248/56 |
| 4,056,252 | 11/1977 | Simon | 248/56 |
| 4,142,064 | 2/1979 | Thomsen | 174/153 |
| 4,188,003 | 2/1980 | Ramsey | 174/153 G |
| 4,190,222 | 2/1980 | Appleton et al. | 248/56 |
| 4,262,409 | 4/1981 | Madej | 29/526 |
| 4,269,378 | 5/1981 | Barry | 174/153 G |
| 4,299,363 | 11/1981 | Datschefski | 248/56 |
| 4,350,839 | 9/1982 | Lass | 174/65 |
| 4,361,302 | 11/1982 | Lass | 248/56 |
| 4,366,343 | 12/1982 | Slater et al. | 174/65 |
| 4,474,489 | 10/1984 | Simon | 403/195 |
| 4,678,146 | 7/1987 | Plyler | 174/153 G |
| 4,919,370 | 4/1990 | Martin et al. | 248/56 |

*Primary Examiner*—Dean A. Reichard
*Assistant Examiner*—Dhiru R Patel
*Attorney, Agent, or Firm*—Fish & Richardson P.C.

[57] ABSTRACT

A side insertion trap for cable or wire includes a base and two arms extending from the base to define an opening between the arms for permitting lateral insertion of a cable or wire between the arms. A retention member, such as one or more angled teeth, serves to inhibit motion of the wire or cable between the arms in a direction perpendicular to a lateral insertion direction.

24 Claims, 9 Drawing Sheets

SIDE INSERTION TRAP

TECHNICAL FIELD

The invention relates to securing cables to an electrical box.

BACKGROUND

When electrical cables are inserted into an electrical box, such as a junction box, metal or plastic traps are used to secure the cables to the box. This prevents longitudinal forces from stressing wire connections in the box and separating the connections.

When a metal trap is used, a pre-punched knockout in the side of the box is removed and the metal trap is inserted in the resulting hole. The trap then is secured in place using a threaded nut in the interior of the box. The electrical cable is then threaded through the trap. Next, the wires of the cable are stripped and any excess cable is backed out of the electrical box. Two screws on the metal trap then are tightened to secure the electrical cable in place. Finally, the wires of the cable are connected and a cover is placed on the electrical box.

When a plastic trap is used, a pre-punched knockout is removed, and the plastic trap is placed around the cable. The plastic trap then is inserted into the hole in the electrical box corresponding to the knockout. The wires then are stripped and connected. Finally, the cover is placed on the electrical box.

A representative electrical cable in both of these examples is a Romex® cable, also known as non-metallic sheathed cable (type NM-B). Such a cable includes multiple conductors and an outer plastic protective sheath.

In both examples, an external trap is positioned in a knockout hole to ensure that the electrical cable remains in place. Normally, the external sheath of the cable and the insulation around individual conductors are removed after the cable is passed through the trap.

SUMMARY

In one general aspect, a side insertion trap for cable or wire includes a base and two arms extending from the base to define an opening between the arms that permits lateral insertion of a cable or wire between the arms. The trap also includes a retention member that resists motion of the wire or cable between the arms perpendicularly to the lateral insertion direction.

Implementations of the trap may include one or more of the following features. For example, in a low-profile implementation, the retention member is positioned in a space defined between the arms. In another implementation, the retention member extends away from a space defined between the arms.

The retention member may include one or more teeth that resist movement of the cable perpendicularly to the lateral insertion direction. The teeth may be located on each side of the opening. For example, a tooth may be located on each arm of the trap. The teeth may be, for example, triangular or rectangular in cross section.

In general, the side insertion trap may be sufficiently resilient to allow compression of the arms of the trap for insertion into a cutout in a wall of an electrical box, and to cause the trap to expand when released to lodge the trap in the cutout. To this end, the opening may include an enlarged portion at the intersection of the arms with the base to ease compression of the arms. The cutout may include tabs that fit in indentations in the side insertion trap to retain the side insertion trap in place. The trap may be made from plastic.

Each arm may include a groove along an outer surface of the arm, with the groove serving to retain the trap in place in the cutout. The grooves may extend around the base to define a single continuous groove. The grooves may be modified to be mated with tabs in the cutout.

Each arm may include a detent that resists movement of the cable or wire laterally out of the opening. In addition, at least one of the arms may include a flared inner surface that serves to ease insertion of a cable or wire into the opening.

The side insertion trap may be positioned in a cutout in a wall of an electrical box or light fixture, or may be implemented as part of the box or fixture. The box also may include traditional pre-punched knockouts, such as circular knockouts.

When implemented as part of the box, the side insertion trap may include a wall segment and an opening cut into an edge of the wall segment. Generally, the opening is wide enough to permit lateral insertion of a cable or wire in a lateral insertion direction. Portions of the wall segment adjacent to the opening are bent to inhibit motion of the wire or cable between the walls perpendicularly to the lateral insertion direction.

The side insertion trap provides an inexpensive, labor saving, cable fitting for inserting and securing an electrical cable in an electrical box. The cable is laterally retained in the trap by a cover of the electrical box, and can be easily removed upon removal of the cover. Detents may be used to further secure the cable laterally.

By allowing lateral insertion of a wire or cable, the side insertion trap eliminates the need to thread the wire or cable through the trap. This permits insulation to be removed (and connections to be made) prior to insertion of the wire or cable into the trap. This, in turn, eases installation.

Other features and advantages will be apparent from the following description, including the drawings, and from the claims.

DETAILED DESCRIPTION

Referring to FIGS. 1 and 2A–2C, a side insertion trap 100 is generally U-shaped and includes a pair of resilient arms 105 extending from a rear portion 110. The arms define a passage 115 into which a cable may be laterally inserted. To ease cable insertion, cutouts 120 on interior surfaces of the and provide the passage with a flared opening. The arms 105 also include narrow regions 122 at their intersections with the rear portion 110. These narrow regions ease compression of the arms during insertion of the trap into a cutout.

Figure 1:
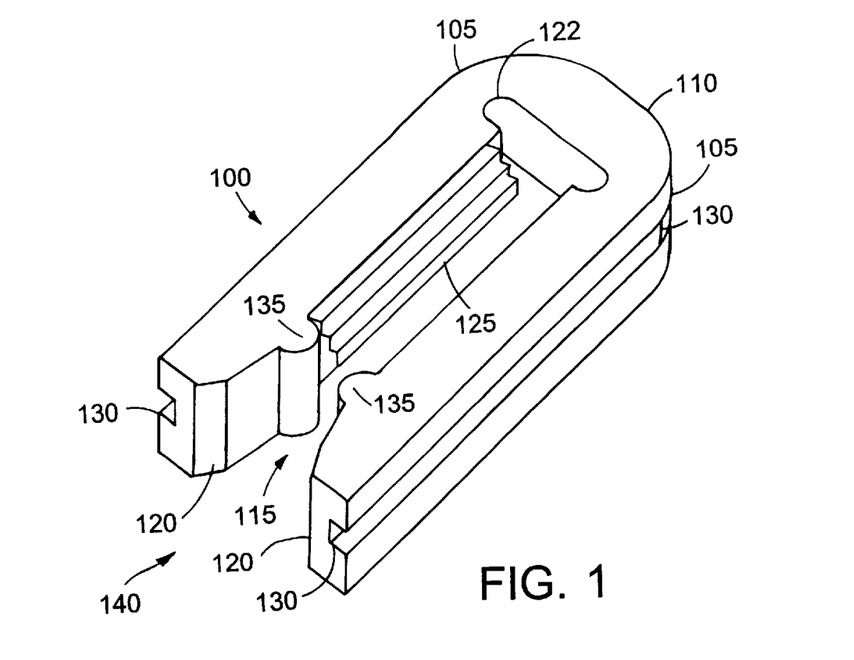
FIG. 1 is a perspective view of a side insertion trap.
Figure 2A:
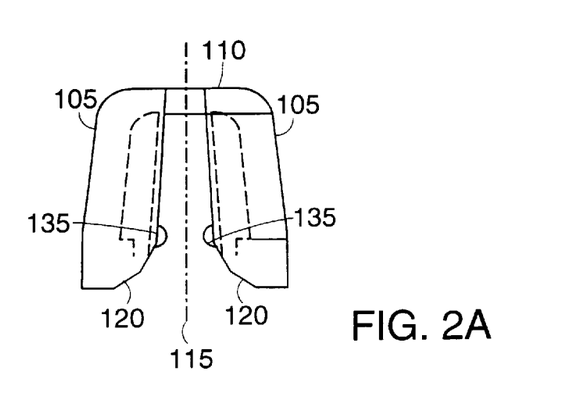
FIGS. 2A–2C are top, end and side views of the side insertion trap of FIG. 1.
Figures 2B, 2C:
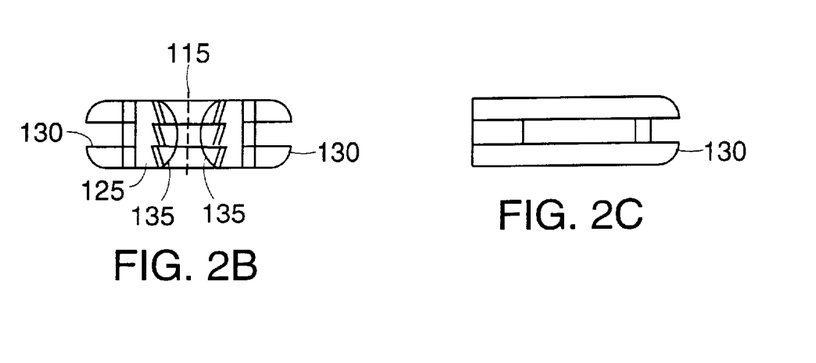

As best shown in FIG. 2B, three angled teeth 125 defined on each arm serve to retain the cable in the electrical box. The angled teeth 125 are positioned within the height of the arms 105 and rear portion 110, and do not extend further into the electrical box. This reduces the height of the side trap, reduces the amount of material used to make the side trap, and maximizes the amount of space available inside the electrical box for electrical connections. The angled teeth 125 allow an electrical cable to be pushed down through the trap, but inhibit the cable from being pulled up.

A groove 130 is formed along the sides and on the back of the side insertion trap 100 to secure the side insertion trap within the cutout of the electrical box. Resiliency of the arms holds the trap in place with the wall of the electrical box positioned in the groove.

Detents 135 laterally retain an electrical cable in the trap. The cable may be inserted laterally into the side insertion trap 100 in the direction 140 indicated in FIG. 1. The detents 135 squeeze the cable as it passes between them. Once the cable moves past the detents 135, the cable returns substantially to its original shape. Thereafter, detents 135 retain the cable in the trap and inhibit the cable from moving laterally out of the trap.

Figure 3A:
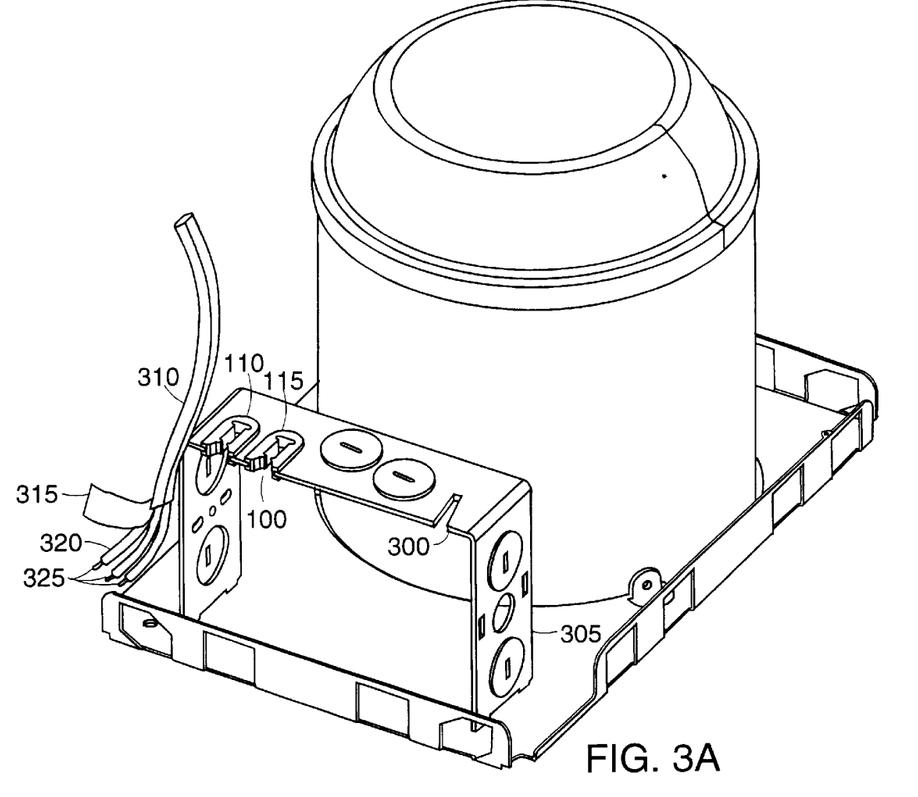
FIG. 3A is a perspective view of a lighting fixture and an electrical box including several side insertion traps with an electrical cable positioned to be inserted into one of the side insertion traps.
Figure 3B:
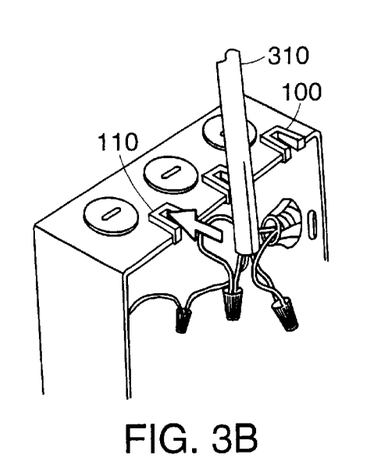
FIG. 3B is a perspective view of an electrical box in which the electrical connections are made prior to the electrical cable being positioned into the side insertion trap.

Referring to FIGS. 3A and 3B, side insertion traps 100 are positioned in an opening 300 cut in an electrical box 305. The electrical box 305 is comparable to a traditional electrical box, with the exception that it includes the openings 300 along its sides. A cable 310 may be inserted laterally into a side insertion trap 100. Because the cable does not need to be inserted into an enclosed opening, the cable sheath 315 and the insulators 320 of the individual wires 325 in the cable 310 can be removed before the cable is inserted laterally into the side insertion trap 100. Indeed, electrical connections may even be made prior to inserting the cable into the side insertion trap 100 as shown in FIG. 3B. This promises to substantially reduce the time associated with installing cables and electrical boxes since electricians will no longer be forced to strip wires and make connections within the confines or the immediate area of the electrical box.

Figure 4:
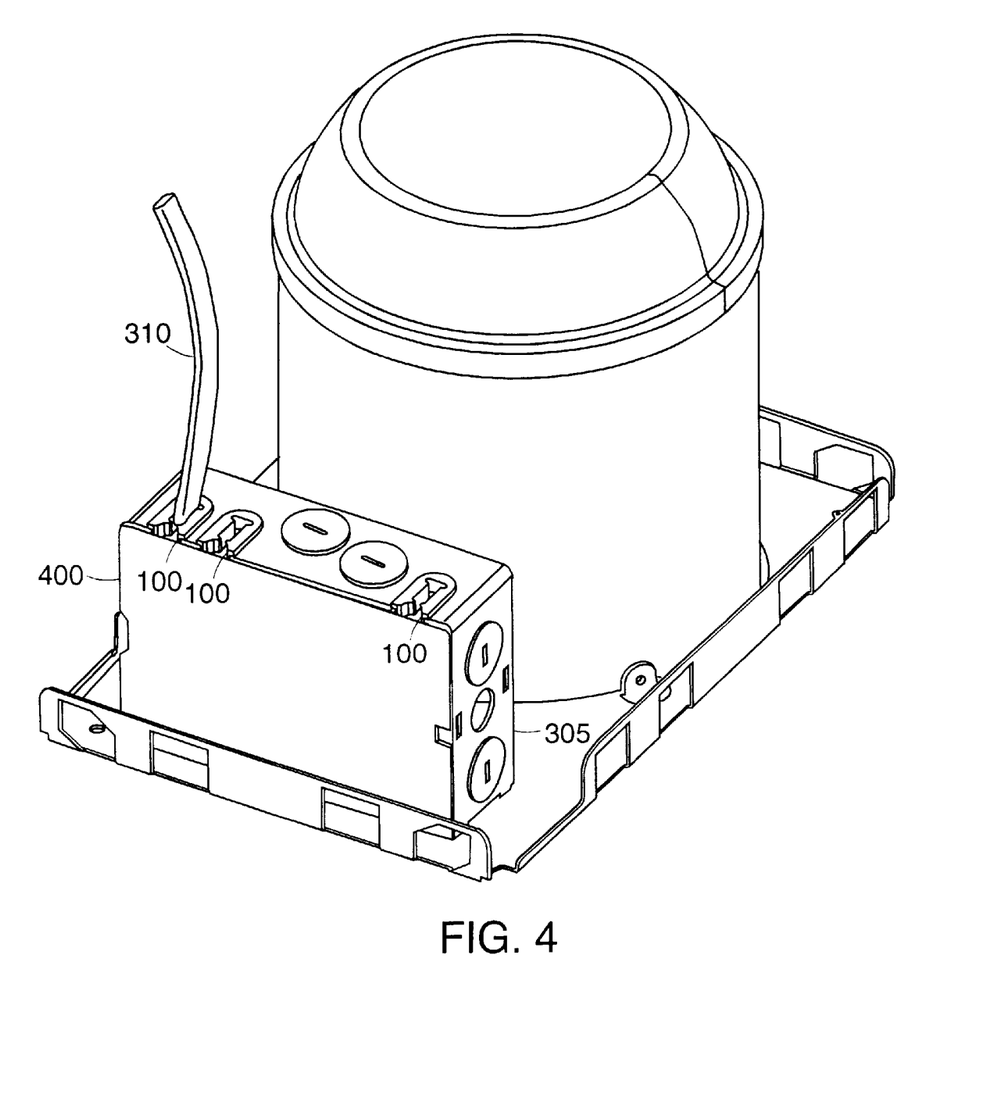
FIG. 4 is a perspective view of a lighting fixture with a covered electrical box and an electrical cable secured by a side insertion trap.
Figure 5:
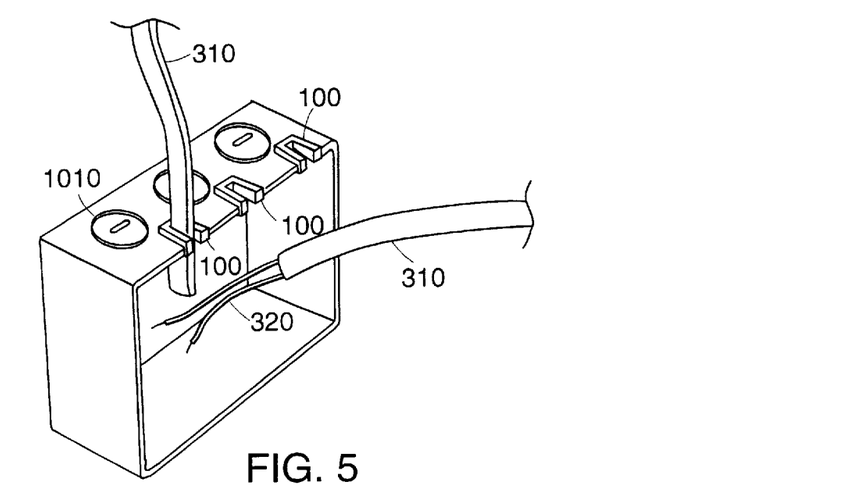
FIG. 5 is a perspective view of an electrical box including a side insertion trap with a cable inserted in the trap.
Figure 6:
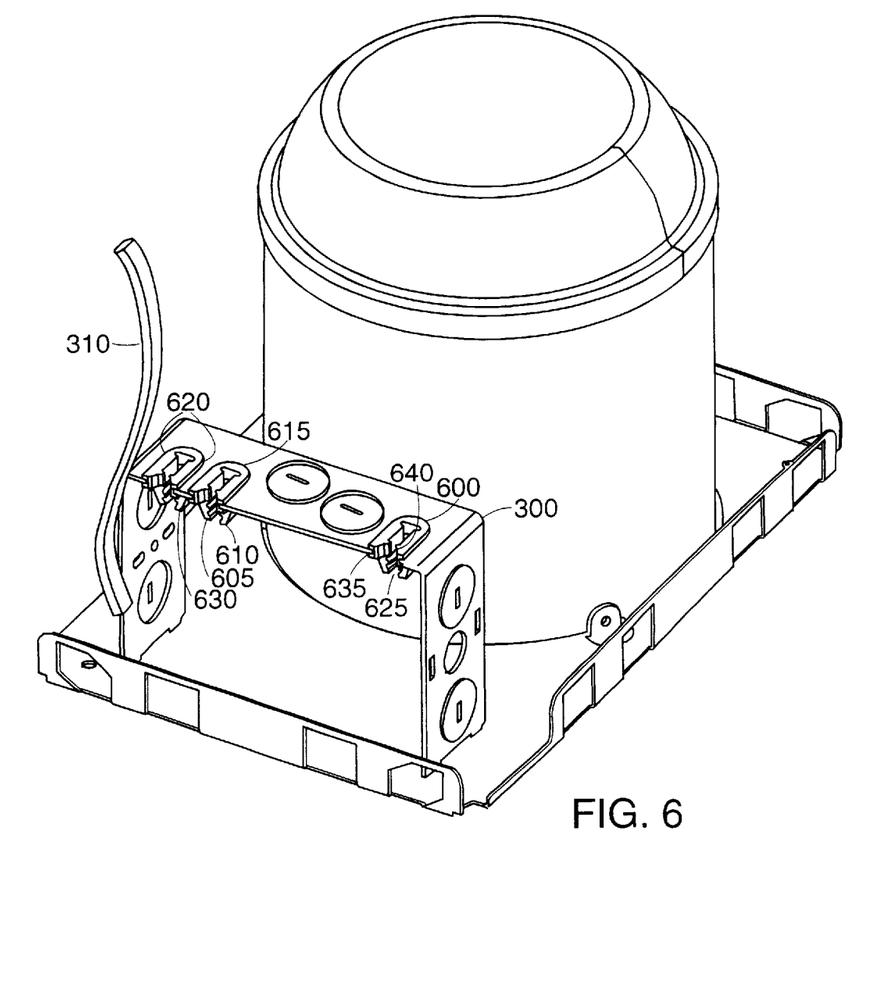
FIG. 6 is a perspective view of a lighting fixture with an electrical box including a second implementation of a side insertion trap.
Figure 7A:
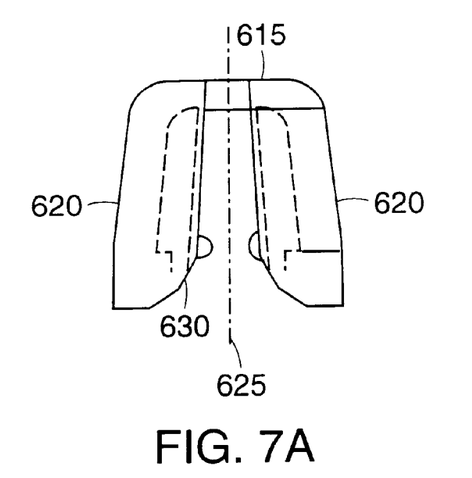
FIGS. 7A–7C are top, end and side views of the side insertion trap of FIG. 6.
Figure 7B:
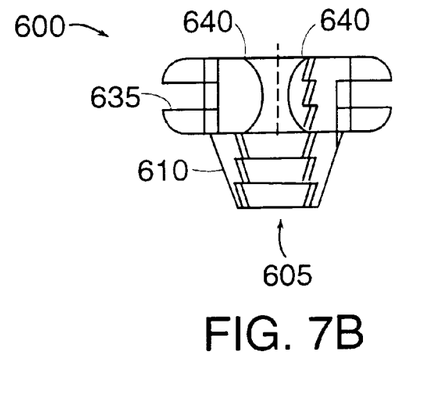
Figure 7C:
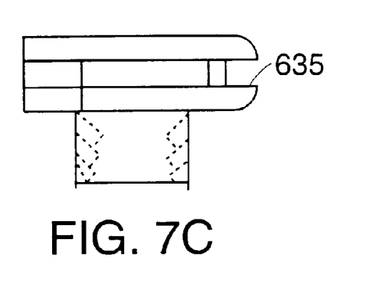
Figure 8A:
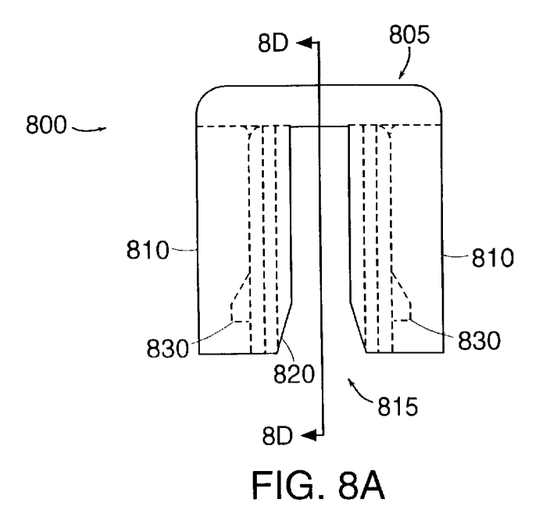
FIGS. 8A–8C are top, front, and side views of a third implementation of a side insertion trap.
Figure 8B:
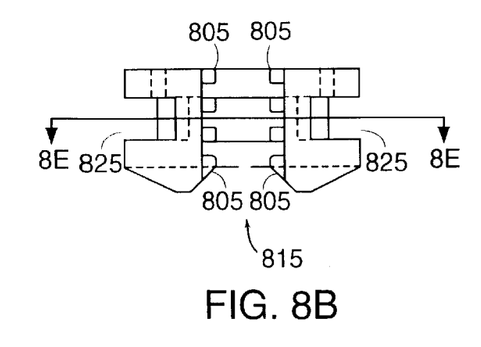
Figure 8C:
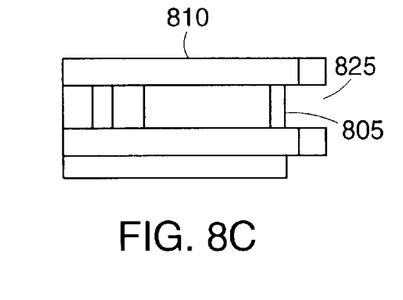
Figure 8D:
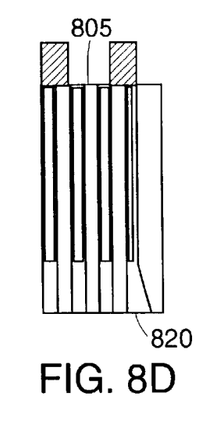
FIG. 8D is a sectional view of the side insertion trap of FIG. 8A taken along line 8D—8D of FIG. 8A.
Figure 8E:
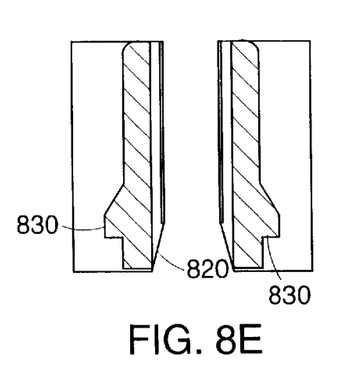
FIG. 8E is a sectional view of the side insertion trap of FIG. 8A taken along line 8E—8E of FIG. 8B.
Figure 9A:
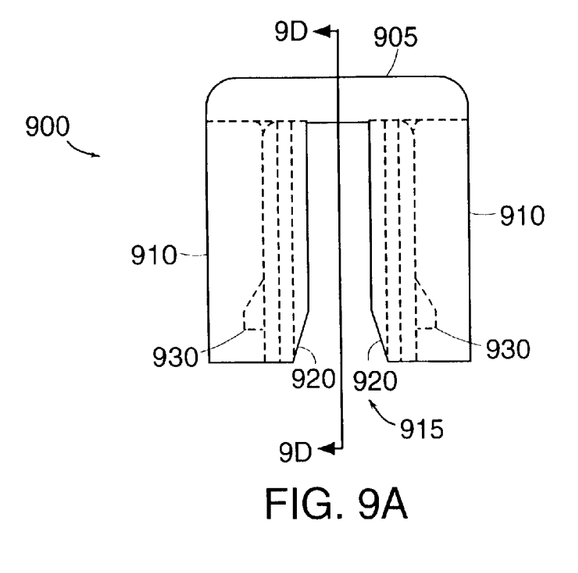
FIGS. 9A–9C are top, front and side views of a fourth implementation of a side insertion trap.
Figure 9B:
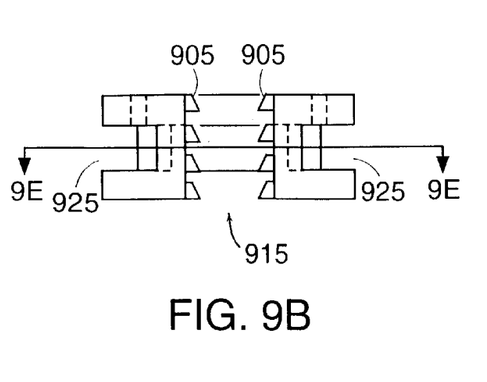
Figure 9C:
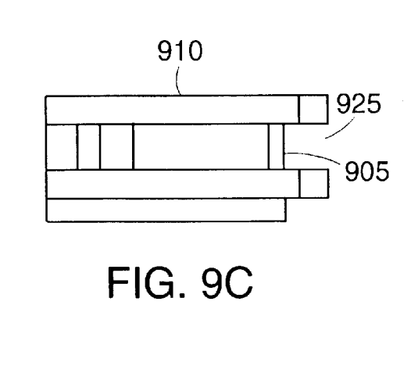
Figure 9D:
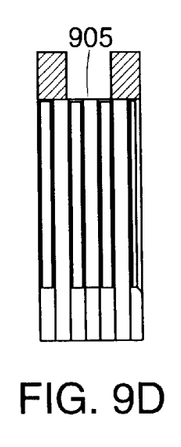
FIG. 9D is a sectional view of the side insertion trap of FIG. 9A taken along line 9D—9D of FIG. 9A.
Figure 9E:
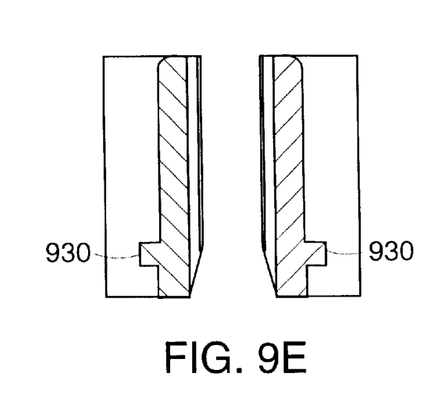
FIG. 9E is a sectional view of the side insertion trap of FIG. 9A taken along line 9E—9E of FIG. 9B.

Once the electrical connections are made, and the electrical wires are properly inserted into the side insertion traps 100, the electrical box's cover 400 is placed on the electrical box as shown in FIG. 4. As shown in FIG. 5, the side insertion trap 100 also may be used in conjunction with traditional traps.

Referring to FIGS. 6 and 7A–7C, another side insertion trap 600 includes angled teeth 605 that extend beneath the trap. This increases the overall height of the trap and places the angled teeth 605 inside the electrical box 300. In this configuration, there are no angled teeth within the portion of the trap which passes through the side wall of the electrical box 300. Instead, the angled teeth are on the inner surface of the portion 610 of the trap which extends into the interior of the electrical box 300. The trap 600 also includes a rear portion 615, a pair of resilient arms 620, a passageway 625, cutouts 630, a groove 635, and detents 640. These elements function as discussed above with respect to trap 100.

Referring to FIGS. 8A–8E, another side insertion trap 800 includes box-like teeth 805, which may extend beneath the trap 800. This slightly increases the overall height of the trap. In this configuration, the majority of the box-like teeth are within the portion of the trap which passes through the side wall of the electrical box 300. The trap 800 includes a rear portion 805, a pair of resilient arms 810, a passageway 815, cutouts 820, and a groove 825. The cutout in the wall of the electrical box includes tabs which mate with indentations 830 in the groove 825. This mating between the indentations 830 and the tabs in the cutout in the wall of the electrical box 300 helps retain the side insertion trap 800 in place.

Referring to FIGS. 9A–9E, another side insertion trap 900 includes angled teeth 905 that are within the portion of the trap which passes through the side wall of the electrical box 300. The trap 900 includes a rear portion 905, a pair of resilient arms 910, a passageway 915, cutouts 920, and a groove 925. The cutout in the wall of the electrical box includes tabs which mate with indentations 930 in the groove 925. This mating between the indentations 930 and the tabs helps retain the side insertion trap 900 in place.

Figure 10:
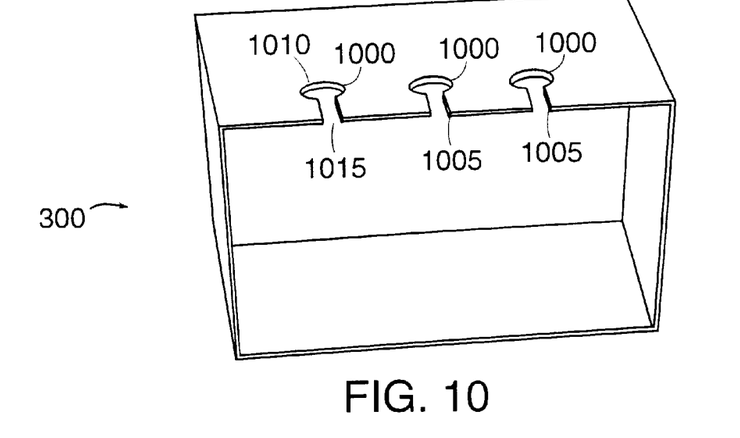
FIG. 10 is a perspective view of an electrical box including a fifth implementation of a side insertion trap.
Figure 11A:
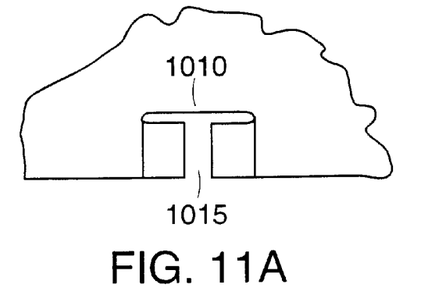
FIGS. 11A and 11B are top and side views of the side insertion trap of FIG. 10.
Figure 11B:
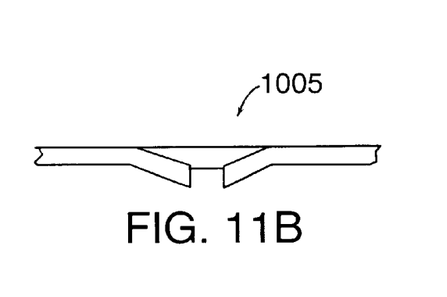

Referring to FIGS. 10 and 11A–11B, cutouts in the side wall of an electrical box 300 also may serve as a trap 1000. The trap 1000 includes angled portions 1005 that prevent an electrical cable from being pulled out of the electrical box. The trap 1000 also includes a rear portion 1010 and a passageway 1015. A cable inserted laterally into the passageway 1015 is held in place longitudinally by the angled portions 1005.

Figure 12:
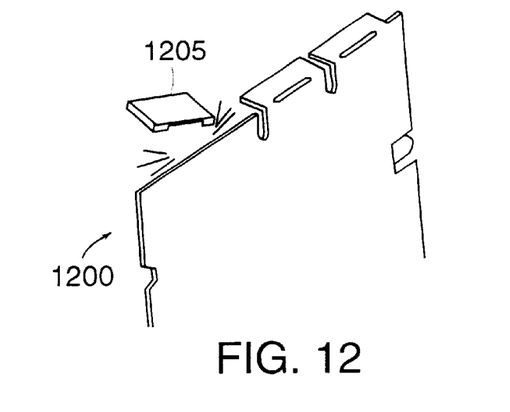
FIG. 12 is a perspective view of a cover of an electrical box with breakaway tabs for use with an electrical box containing side insertion traps.

Referring to FIG. 12, a cover 1200 for an electric box includes breakaway tabs 1205. A tab 1205 corresponding to a side insertion trap being used may be removed to allow room for the cable inserted in the side insertion trap.

Figure 13:
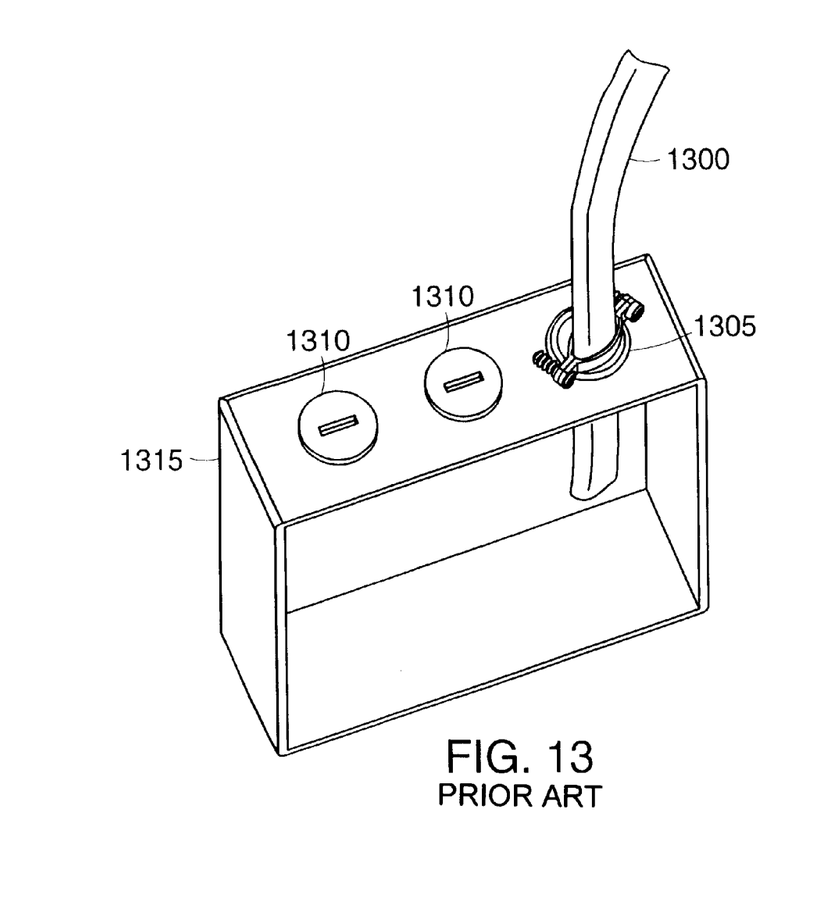
FIG. 13 is a perspective view of a prior art electrical box with a pre-punched knockout removed, a metal trap inserted, and an electrical cable inserted through the metal trap.
Figure 14:
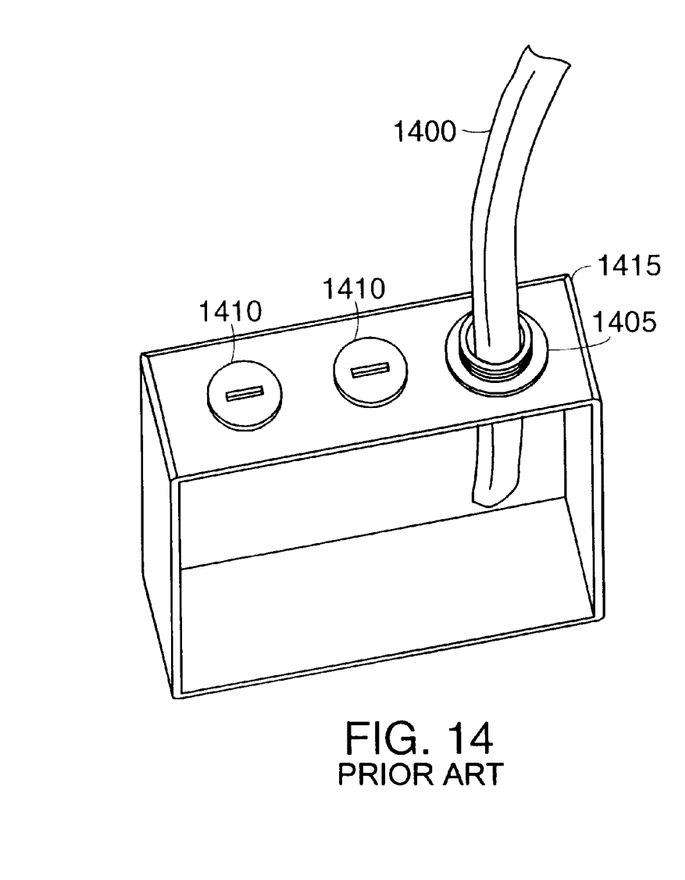
FIG. 14 is a perspective view of a prior art electrical box with a pre-punched knockout removed and a plastic trap and an electrical cable inserted through the plastic trap.

FIG. 13 shows an electrical cable 1300 retained by a prior art metal trap 1305 inserted through a pre-punched knockout 1310 in an electrical box 1315. FIG. 14 shows an electrical cable 1400 retained by a prior art plastic trap 1405 inserted through a pre-punched knockout 1410 in an electrical box 1415.

Other embodiments are within the scope of the following claims.

What is claimed is:

1. A side insertion trap for cable or wire, the trap comprising:

a base;

two arms extending from the base in a lateral insertion direction to define an opening between the arms for permitting lateral insertion of a cable or wire between the arms along the lateral insertion direction, with a central axis of the cable or wire being generally perpendicular to the lateral insertion direction; and a retention member serving to inhibit motion of the wire or cable between the arms in a direction along the central axis of the wire or cable and perpendicular to the lateral insertion direction.

2. The side insertion trap of claim 1, wherein the retention member is positioned in a space defined between the arms.

3. The side insertion trap of claim 1, wherein the retention member extends beyond a space defined between the arms.

4. The side insertion trap of claim 1, wherein the retention member comprises at least two pairs of the teeth, with each of the two pairs including a tooth on each side of the opening.

5. The side insertion trap of claim 1, wherein the trap is sufficiently resilient to allow compression of the arms of the trap for insertion into a cutout in a wall of an electrical box and to cause the trap to expand when released to lodge the trap in the cutout.

6. The side insertion trap of claim 5, wherein the arms comprise narrow regions at the intersection of the arms with the base to ease compression of the arms.

7. The side insertion trap of claim 1, wherein at least one of said two arms comprises a detent, the detent serving to resist movement of the cable or wire laterally out of the opening.

8. The side insertion trap of claim 1, wherein at least one of said two arms comprises a flared inner surface, the flared inner surface serving to ease insertion of the cable or wire into the opening.

9. The side insertion trap of claim 1, wherein the trap is made out of plastic.

10. The side insertion trap of claim 1, wherein the trap resists motion in a first direction perpendicular to the lateral insertion direction but allows motion in a second direction perpendicular to the lateral insertion direction and opposite the first direction perpendicular to the lateral insertion direction.

11. A side insertion trap for cable or wire, the trap comprising:

a base;

two arms extending from the base to define an opening between the arms for permitting lateral insertion of a cable or wire between the arms in a lateral insertion direction; and a retention member serving to inhibit motion of the wire or cable between the arms in a direction perpendicular to the lateral insertion direction, wherein the retention member comprises at least one tooth which resists movement of the cable in the direction perpendicular to the lateral insertion direction.

12. The side insertion trap of claim 11, wherein the retention member comprises at least one pair of teeth, the at least one of teeth including a tooth on each side of the opening.

13. The side insertion trap of claim 12, wherein the at least one pair of teeth includes a tooth on each arm trap.

14. The side insertion trap of claim 12, wherein each of said at least one pair of teeth has a generally triangular cross-section.

15. The side insertion trap of claim 12, wherein each of said at least one pair of teeth has a generally rectangular cross-section.

16. The side insertion trap of claim 11, wherein the at least one tooth has a generally triangular cross-section.

17. The side insertion trap of claim 11, wherein the at least one tooth has a generally rectangular cross-section.

18. A side insertion trap for cable or wire, the trap comprising:

a base;

two arms extending from the base to define an opening between the arms for permitting lateral insertion of a cable or wire between the arms in a lateral insertion direction; and a retention member serving to inhibit motion of the wire or cable between the arms in a direction perpendicular to the lateral insertion direction;

wherein the trap is sufficiently resilient to allow compression of the arms of the trap for insertion into a cutout in a wall of an electrical box and to cause the trap to expand when released to lodge the trap in the cutout;

wherein the trap includes an indentation which mates with a tab in the cutout in the wall of the electrical box to aid in the retention of the side insertion trap in the wall of the electrical box.

19. A side insertion trap for cable or wire, the trap comprising:

a base;

two arms extending from the base to define an opening between the arms for permitting lateral insertion of a cable or wire between the arms in a lateral insertion direction; and a retention member serving to inhibit motion of the wire or cable between the arms in a direction perpendicular to the lateral insertion direction;

wherein each arm comprises a groove along an outer surface of the arm, the grooves serving to retain the side insertion trap in place on a wall of an electrical box.

20. The side insertion trap of claim 19, wherein the grooves on the arms extend around the base of the side insertion trap to define a single continuous groove.

21. A side insertion trap assembly including:

an electrical box, and a side insertion trap for cable or wire, the trap comprising:

a base, two arms extending from the base in a lateral insertion direction to define an opening between the arms for permitting lateral insertion of a cable or wire between the arms along the lateral insertion direction, with a central axis of the cable or wire being generally perpendicular to the lateral insertion direction, and a retention member serving to inhibit motion of the wire or cable between the arms in a direction along the central axis of the wire or cable and perpendicular to the lateral insertion direction;

wherein the side insertion trap is positioned in a wall of the electrical box.

22. The side insertion trap assembly of claim 21, wherein the electrical box further comprises at least one pre-punched knockout.

23. The side insertion trap assembly of claim 21, wherein the electrical box further comprises a light fixture.

24. A side insertion trap assembly for cable or wire, the side insertion trap assembly comprising:

an electrical box comprising one or more walls, at least one of the walls comprising a wall segment; and an opening cut into an edge of the wall segment, the opening being wide enough to permit lateral insertion of a cable or wire in a lateral insertion direction;

wherein portions of the wall segment adjacent to the opening are angled so as to inhibit motion of the wire or cable between the walls in a direction perpendicular to the lateral insertion direction.

* * * * *